May 19, 1970   W. J. WESTENDORF   3,512,665
QUICK ATTACH MEANS FOR END LOADERS
Filed Feb. 14, 1968

INVENTOR
WALTER J. WESTENDORF
BY
Zarley, McKee & Thomte
ATTORNEYS

United States Patent Office 3,512,665
Patented May 19, 1970

3,512,665
QUICK ATTACH MEANS FOR END LOADERS
Walter J. Westendorf, Smithland, Iowa 51056
Filed Feb. 14, 1968, Ser. No. 705,498
Int. Cl. E02f 3/70
U.S. Cl. 214—145                                    11 Claims

ABSTRACT OF THE DISCLOSURE

A quick attach means for end loaders such as tractor loaders or the like. A tractor loader includes a pair of booms operatively pivotally secured at one end to the tractor. A hydraulic cylinder is operatively pivotally secured to each of the booms and is positioned over the other end thereof. A hook-up bracket is pivotally secured to the said other end of each boom and the hydraulic cylinder and includes a V-shaped portion extending therefrom. Each of the various attachments for the loader such as buckets, forks, blades, etc. have a pair of V-shaped pockets secured to the rearward side thereof which are adapted to receive a hook-up bracket therein. A locking means is also provided to detachably maintain the connection between the hook-up brackets and their respective pockets.

---

Conventional end loaders such as tractor loaders or the like usually have a pair of booms pivotally secured at their rearward ends to the tractor and pivotally secured at their forward ends to the attachment by means of a pin extending through spaced apart ears on the attachment and through the boom. The hydraulic cylinders are also usually pivotally connected to the rearward end of the attachment by means of pins substantially similar to the manner in which the booms are pivotally secured to the attachment. Thus, when it is desired to remove a particular attachment from the loader, it is necessary to remove four pins and to subsequently replace the pins in another attachment. It is difficult and time consuming in attempting to position the four pins for insertion in their respective openings and the hook-up difficulty is further increased due to the fact that the piston rods of the hydraulic cylinders are sometimes difficult to align since one rod may tend to extend farther than the rod on the other hydraulic cylinder. The connection and the disconnection of the various attachments is also difficult when the attachment is not on exactly level ground.

Therefore, it is a principal object of this invention to provide a quick attach means for end loaders such as tractor loaders or the like.

A further object of this invention is to provide a quick attach means for tractor loaders which permit the connection and disconnection of various attachments to the loader without the tractor operator leaving the tractor.

A further object of this invention is to provide a quick attach means for tractor loaders or the like which eliminates any "play" between the attachment and the loader.

A further object of this invention is to provide a quick attach means for tractor loaders or the like including a pair of hook-up brackets pivotally secured to the forward ends of the booms, the brackets being detachably received by a pocket means secured to the rearward end of the various attachments.

A further object of this invention is to provide a quick attach means for end loaders which permits the connection and disconnection of the attachment with respect to the loader whether the ground is level or not.

A further object of this invention is to provide a quick attach means for tractor loaders or the like having means thereon to limit the pivotal movement of the attachment with respect to the loader.

A further object of this invention is to provide a quick attach means for tractor loaders or the like which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
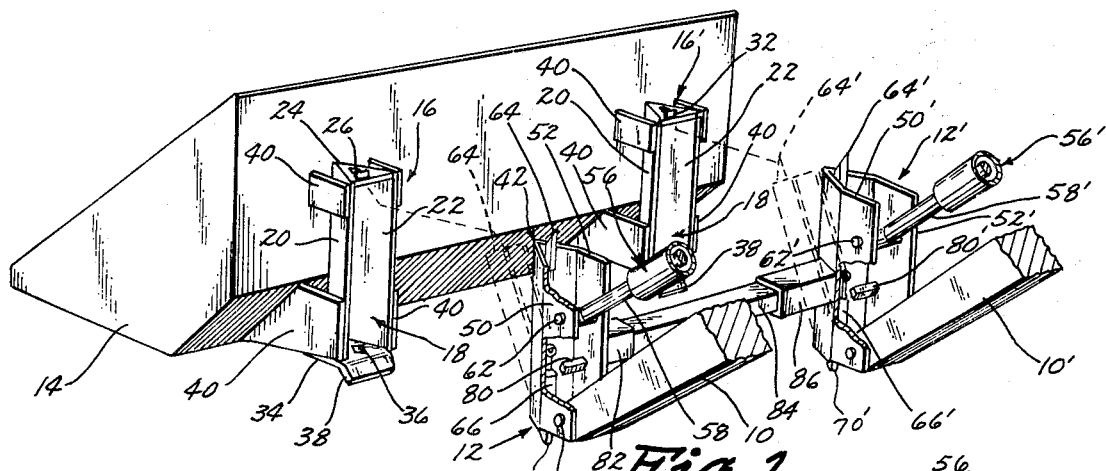
FIG. 1 is a rear fragmentary perspective view of the quick attach means with portions thereof cut away to more fully illustrate the invention, the broken lines indicating the manner in which the connection between the attachment and the loader is accomplished.

The numerals 10 and 10' generally designate conventional loader booms which are pivotally connected at their rearward ends to the tractor or the like and would be raised or lowered with respect thereto by a hydraulic cylinder means which is not shown. The numerals 12 and 12' generally designate hook-up brackets which are pivotally connected to the booms 10 and 10' respectively. Inasmuch as hook-up brackets 12 and 12' are identical, only hook-up bracket 12 will be described in detail with identical structure on hook-up bracket 12' designated by "'."

Figure 5:
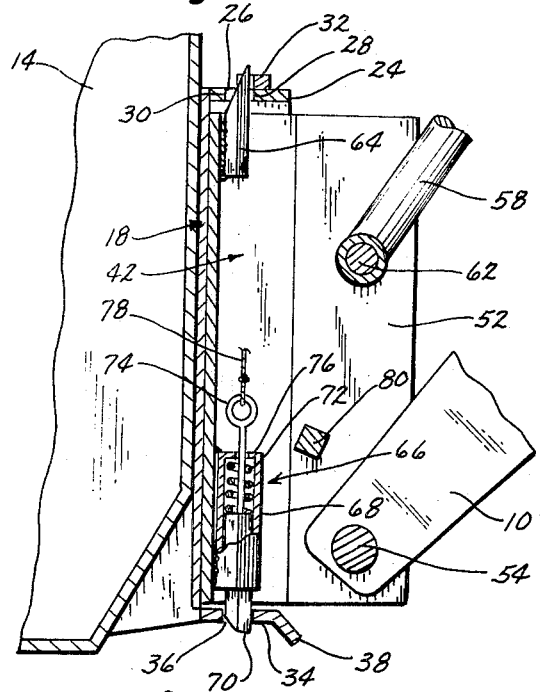
FIG. 5 is a sectional view as seen along line 5—5 of FIG. 4 with portions thereof cut away to more fully illustrate the invention.
Figure 4:
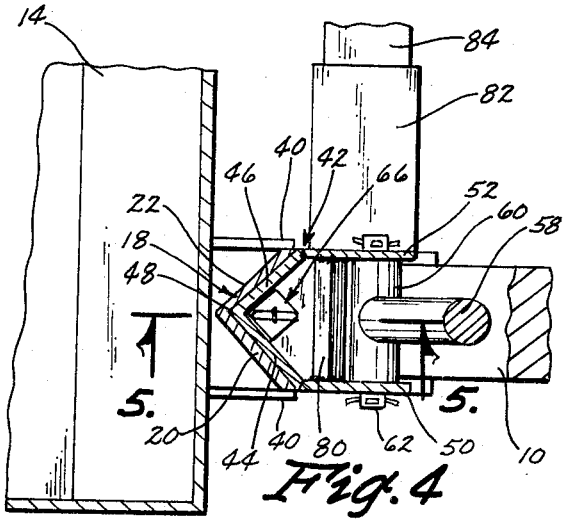
FIG. 4 is an enlarged sectional view as seen along lines 4—4 of FIG. 3.

The numeral 14 designates a bucket attachment for loader and it should be understood that the attachment 14 could be replaced by any of several attachments such as blades, forks, etc. A pair of pocket means 16 and 16' are secured to the rearward end of attachment 14. Inasmuch as pocket means 16 and 16' are identical, only pocket means 16 will be described with identical structure on pocket means 16' being designated by "'." Pocket means 16 includes a vertically disposed channel 18 which is comprised of forward wall portions 20 and 22 generally forming a V-shape as best illustrated in FIG. 4. A plate 24 is secured to the upper end of channel 18 and is provided with a square opening 26 extending therethrough. Square opening 26 is oriented so that the rearward end of the opening comes to a point at 28 while the forward end thereof comes to a point at 30. A V-shaped ear 32 is secured to plate 24 adjacent opening 26 to provide a larger wear surface. A plate 34 is secured to the lower end of channel 18 and is provided with a square opening 36 formed therein. Plate 34 is provided with a downwardly extending portion 38 at its rearward end which is best illustrated in FIG. 5. Opening 36 is oriented in the same manner as opening 26 as best illustrated in FIG. 1. Channel 18 is secured to the rearward end of attachment 14 by means of a plurality of plates 40 welded thereto and extending therebetween as illustrated in FIGS. 1 and 4.

Hook-up bracket 12 includes a V-shaped channel 42 defined by wall portions 44 and 46 which are adapted to be received by channel 18 as illustrated in FIG. 4. As seen in FIG. 4, the forward end of channel 42 is slightly rounded off at 48 for a reason to be discussed later. Spaced apart plates 50 and 52 extend rearwardly from rearward ends of wall portions 44 and 46 respectively as seen in the drawings.

Boom 10 is pivotally connected to hook-up bracket 12 by means of a pin 54 extending through plate 50, boom 10 and plate 52 adjacent the lower ends of plates 50 and 52. Conventional cotter keys extending through opposite ends of pin 54 prevent inadvertent removal thereof. The numeral 56 generally designates a conventional hydraulic cylinder means including a rod 58 slidably extending from the forward end thereof. A sleeve 60 is welded to the forward end of rod 58 and is adapted to receive a pin 62 extending therethrough and through plates 50 and 52 adjacent the upper end thereof as illustrated in the drawings. The rearward end of hydraulic cylinder 56 is pivotally connected to boom 10 rearwardly of the forward end thereof and would be operatively connected to the tractor hydraulic system. The extension of rod 58 causes the hook-up bracket 12 to be pivoted from the position illustrated in solid lines in FIG. 1 to the position illustrated by broken lines in FIG. 1.

A hook 64 is welded to the upper interior of channel 42 and extends upwardly therefrom as illustrated in FIGS. 1 and 5. Hook 64 is square in cross-section and is adapted to be received by the opening 26. As illustrated in FIGS. 1 and 5, hook 64 is tapered at its upper forward end to facilitate the insertion of the hook in the opening 26. A locking pin means 66 is welded to the lower interior surface of channel 42 adjacent the lower end thereof and includes a casing 68 having a plunger 70 slidably extending from the lower end thereof as illustrated in FIG. 5. A spring means 72 in casing 66 normally yieldably resists the upper movement of plunger 70 with respect to casing 68. An eye bolt 74 is connected to plunger 70 and extends through the top 76 of casing 66 as illustrated in FIG. 5. A suitable cable 78 or the like is connected to eye bolt 74 and would extend to the operator's platform on the tractor. A stop means 80 is welded to plates 50 and 52 and extends therebetween at a point above pin 54 and is adapted to engage boom 10 to limit the pivotal movement of the attachment 14 in one direction with respect to the boom 10. The rearwardly extending portion 38 also serves as a stop means and is designed to engage the lower end of boom 10 to limit the pivotal movement of the attachment 14 in one direction.

A hollow tube 82 is welded to plate 52 and extends inwardly therefrom as illustrated in FIGS. 1 and 4. Tube 82 receives one end of a solid tube 84 which is rigidly secured thereto. The other end of tube 84 is slidably received by a hollow tube 86 which is welded to plate 50'. The slidable connection of tube 84 in tube 86 permits the distance between the hook-up brackets 12 and 12' to be varied according to the particular loader to which it is to be secured.

Figure 2:
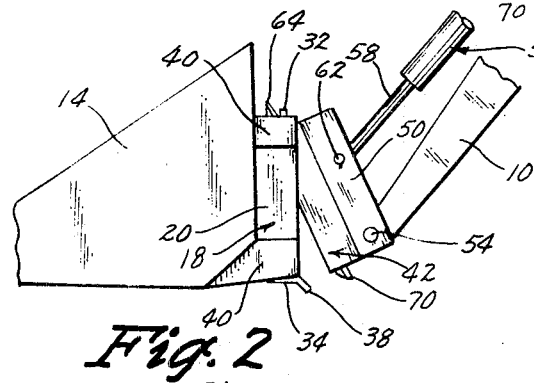
FIG. 2 is a partial side view of the quick attach means illustrating the hook-up bracket being partially received by the pocket means at the rear of the attachment.
Figure 3:
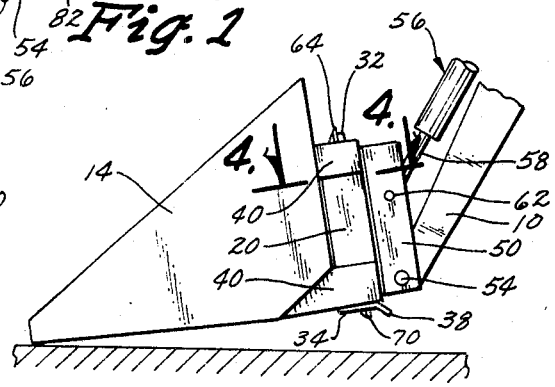
FIG. 3 is a view similar to FIG. 2 and illustrates the hook-up bracket being fully received by the pocket means.

The normal method of operation is as follows. Assuming that the attachment 14 is disconnected from the loader as illustrated in FIG. 1, the hydraulic cylinders 56 and 56' would be operated so that the rods 58 and 58' would slidably extend therefrom thereby causing the upper forward ends of the hook-up brackets 12 and 12' to be tipped forwardly to the position illustrated by broken lines in FIG. 1. The tractor would then be moved forwardly so that the hooks 64 and 64' would be received within channels 18 and 18'. Hydraulic cylinders 56 and 56' would then be operated so that hook-members 64 and 64' would move upwardly through the openings 26 and 26'. FIG. 2 illustrates the relationship of the hook-up bracket 12 and the pocket means 16 after the hook 64 has been received by the opening 26. The continued rearward pivotal movement of the hook-up bracket 12 together with the raising of the boom 10 will cause the lower end of plunger 70 to engage the rearwardly inclined portion 38 of plate 34 which causes plunger 70 to be moved upwardly into casing 66 permitting the lower end of the plunger to slide along the upper surface of the plate 34 until such time as plunger 70 is received by the opening 36. As soon as plunger 70 is received by the opening 36, hook-up bracket 12 has been locked into place in the pocket means 16. The pockets 16 and 16' will receive the hook-up brackets 12 and 12' respectively even if the attachment 14 is not on level ground since the raising of the booms 10 will tend to align the respective structural components and the mating engagement of the channels 18 and 42 and 18' and 42' will also tend to align the structure. As illustrated in FIG. 4, the forward sides of wall portions 44 and 46 engage the rearward portions of wall portions 18 and 20 thereby insuring that there will be absolutely no "play" in the connection of the attachment. In effect, a "wedge inside of a wedge" mating engagement has been provided. As previously stated, channel 42 is rounded at its forward end at 48 so that any wear on the mating surfaces of the channels 18 and 42 will permit the channel 42 to be further received by the channel 18 which would be otherwise prohibited by the pointed forward end of the channel 42.

The relationship of the hook 64 with respect to its opening 26 is such that a pair of angularly disposed wear surfaces are provided on the hook 64 as well as in the plate 24. The orientation of the plunger 70 and the opening 36 in plate 34 also provides a pair of angularly disposed wear surfaces adjacent the forward and rearward ends of the opening 36.

The attachment 14 is disconnected from the tractor loader by simply pulling the cables connected to the plungers in the locking means 66 and 66' so that the plungers will be removed from the opening 36 and 36'. The tractor can then be backed rearwardly from the attachment 14 while causing the hydraulic cylinders to tip the hook-up brackets 12 and 12' forwardly so that the hooks 64 and 64' can move out of the openings 26 and 26' respectively.

It can be seen that a quick attach means has been provided for connecting various attachments to a tractor loader or the like which does not require that the operator of the tractor leave the operator's platform. Various attachments may be quickly and easily connected to the loader without the necessity of attempting to align various pins, openings, etc. It should also be noted that the particular structure of the pocket means 16 and brackets 12 is such that there will be no "play" whatsoever in the connection. In the event that the openings 26 and 36 become enlarged due to wear, it is simply necessary to spot weld shims therein to reduce the size of the openings. Preferably, the hook-up brackets and the pocket means are constructed of a suitable steel material to insure sufficient durability. It should also be noted that the upper end of casing 68 of locking pin means is closed except for the opening through which the eye bolt 74 passes thereby preventing dirt, snow, water, etc., from entering the interior of the casing 68.

Thus it can be seen that the quick attach means accomplishes at least all of its stated objectives.

I claim:
1. In combination,
   an end loader adapted to be mounted on a powered vehicle and including a pair of pivotal booms,
   said end loader including a pair of hydraulic cylinder means each pivotally secured at one end to one of said booms,
   a first hook-up bracket means pivotally secured to one of said booms and one of said hydraulic cylinder means,
   a second hook-up bracket means pivotally secured to to the other of said booms and the other of said hydraulic cylinder means,
   an attachment having a pair of spaced apart pocket means secured to its rearward end which are adapted to detachably receive said hook-up brackets therein,
   and means selectively maintaining said hook-up brackets in said pocket means, each of said pocket means including a V-shaped channel having upper and lower ends, a top plate secured to the upper end of said channel, a bottom plate secured to the lower end of said channel, each of said hook-up brackets including a V-shaped channel having upper and lower ends, said bracket channel being received by said pocket means channel between said top and bottom plates.

2. The combination of claim 1 wherein each said top plates of said pocket means have an opening formed therein and wherein each of said bracket channels have a hook means secured to its upper end extending upwardly therefrom which is adapted to extend through the opening in said top plate.

3. The combination of claim 1 wherein each of said bottom plates have an opening formed therein and wherein each of said bracket channels have a spring loaded plunger means secured thereto which is adapted to extend through the opening in said bottom plate to maintain said hook-up bracket channel in said pocket means.

4. The combination of claim 3 wherein each of said bottom plates have a rear portion extending downwardly and rearwardly therefrom which is adapted to engage said boom to limit the pivotal movement of the attachment in one direction.

5. The combination of claim 2 wherein said opening in said top plate and said hook means provide a V-shaped wear surface at the rearward ends thereof.

6. The combination of claim 3 wherein said opening in said bottom plate and said plunger means provide a V-shaped wear surface at the rearward ends thereof.

7. The combination of claim 1 wherein the forward end of said V-shaped channel of said hook-up bracket is rounded to that any wear on the opposing surfaces of the channels will permit the hook-up bracket channel to be further received by the pocket means channel.

8. The combination of claim 1 wherein a pair of spaced apart plates are secured to each of said V-shaped channels of said hook-up brackets and extends rearwardly therefrom, said boom and said hydraulic cylinder means being pivotally secured to said spaced apart plates.

9. The combination of claim 8 wherein a stop means is secured to said spaced apart plates which is adapted to engage said boom to limit the pivotal movement of the bracket in one direction with respect to the boom.

10. The combination of claim 4 wherein said rear portion extending downwardly and rearwardly from each of said bottom plates also serves as a guide means to engage and move the lower end of the plunger means upwardly as said hook-up bracket is being received by said pocket means.

11. In combination,
an end loader adapted to be mounted on a powered vehicle and including a pair of pivotal booms,
said end loader including a pair of hydraulic cylinder means each pivotally secured at one end to one of said booms,
a first hook-up bracket means pivotally secured to one of said booms and one of said hydraulic cylinder means,
a second hook-up bracket means pivotally secured to the other of said booms and the other of said hydraulic cylinder means,
an attachment having a pair of spaced apart pocket means secured to its rearward end which are adapted to detachably receive said hook-up brackets therein,
and detent locking means automatically locking said hook-up brackets in said pocket means,
each of said pocket means and hook-up bracket means received thereby having opposing surfaces which are complementary in shape and which are positioned in a superimposed relationship with respect to each other.

References Cited

UNITED STATES PATENTS

| 3,237,795 | 3/1966 | Kromer | 214—145 X |
| 3,306,630 | 2/1967 | Weiste | 172—272 X |
| 3,389,819 | 6/1968 | Schumacher | 214—145 X |
| 3,417,886 | 12/1968 | Stuart | 214—145 |

HUGO Q. SCHULZ, Primary Examiner

U.S. Cl. X.R.

172—273